(12) United States Patent
Kilpelainen et al.

(10) Patent No.: US 10,408,608 B2
(45) Date of Patent: Sep. 10, 2019

(54) ARRANGEMENT AND METHOD FOR ALIGNING GUIDE RAILS OF AN ELEVATOR

(71) Applicant: Kone Corporation, Helsinki (FI)

(72) Inventors: Pekka Kilpelainen, Helsinki (FI); Mikael Haag, Helsinki (FI)

(73) Assignee: Kone Corporation, Helsinki (FI)

( * ) Notice: Subject to any disclaimer, the term of this patent is extended or adjusted under 35 U.S.C. 154(b) by 25 days.

(21) Appl. No.: 15/810,441

(22) Filed: Nov. 13, 2017

(65) Prior Publication Data

US 2018/0172439 A1 Jun. 21, 2018

(30) Foreign Application Priority Data

Dec. 19, 2016 (EP) .................................... 16204915

(51) Int. Cl.
  *G01B 11/27* (2006.01)
  *B66B 19/00* (2006.01)
  *B66B 7/02* (2006.01)

(52) U.S. Cl.
  CPC .......... *G01B 11/272* (2013.01); *B66B 19/002* (2013.01); *B66B 7/02* (2013.01)

(58) Field of Classification Search
  CPC ........ G01B 11/272; B66B 19/002; B66B 7/02
  USPC ....................................................... 256/138
  See application file for complete search history.

(56) References Cited

U.S. PATENT DOCUMENTS

| 2006/0243531 | A1* | 11/2006 | Bjorni | ..................... B66B 11/08 187/260 |
| 2007/0017750 | A1* | 1/2007 | Mustalahti | ............ B66B 11/007 187/254 |
| 2009/0273788 | A1* | 11/2009 | Nagle, II | ................. B61K 9/08 356/445 |
| 2014/0345121 | A1* | 11/2014 | Erny | ....................... B66B 19/00 29/720 |
| 2015/0217972 | A1* | 8/2015 | Hawkins | ................ G01C 15/10 187/391 |

FOREIGN PATENT DOCUMENTS

| EP | 2872432 A1 | 5/2015 |
| EP | 3085657 A1 | 10/2016 |
| EP | 3085660 A1 | 10/2016 |
| JP | 4404949 B1 | 1/2010 |
| JP | 2010235247 A | * 10/2010 |

OTHER PUBLICATIONS

European Search Report dated Jun. 28, 2017 issued in corresponding European Application No. 16204915.9.

* cited by examiner

*Primary Examiner* — Isiaka O Akanbi
(74) *Attorney, Agent, or Firm* — Harness, Dickey & Pierce, P.L.C.

(57) ABSTRACT

An arrangement for aligning guide rails of an elevator, comprising a carrier moving upwards and downwards in an elevator shaft along guide rails, at least one plumb line being provided in the vicinity of each guide rail. A laser scanner is attached fixedly or movably to the carrier or to the guide rail or to an apparatus, which is supported on walls of the elevator shaft and/or on the carrier. The horizontal position of the guide rail in relation to the plumb line is determined with the laser scanner.

11 Claims, 4 Drawing Sheets

ARRANGEMENT AND METHOD FOR ALIGNING GUIDE RAILS OF AN ELEVATOR

This application claims priority to European Patent Application No. EP16204915.9 filed on Dec. 19, 2016, the entire contents of which are incorporated herein by reference.

FIELD OF THE INVENTION

The invention relates to an arrangement and to a method for aligning guide rails of an elevator.

BACKGROUND ART

An elevator comprises typically a car, an elevator shaft, a machine room, lifting machinery, ropes, and a counter weight. The elevator car may be positioned within a car frame, whereby the car frame may be integrated into the car structures or formed as a separate frame. The lifting machinery may be positioned in the machine room and may comprise a drive, an electric motor, a drive pulley, and a machinery brake. The lifting machinery may move the car in a vertical direction upwards and downwards in the vertically extending elevator shaft. The ropes may connect the car frame via the drive pulley to the counter weight. The car frame may further be supported with glide means on car guide rails extending along the height of the shaft. The car guide rails may be supported with fastening brackets on the side wall structures of the shaft. The glide means may engage with the car guide rails and keep the car in position in the horizontal plane when the car moves upwards and downwards in the elevator shaft. The counter weight may be supported in a corresponding way on counter weight guide rails supported on the wall structure of the shaft. The car may transport people and/or goods between the landings in the building. The shaft may be formed so that the wall structure is formed of solid walls or so that the wall structure is formed of an open steel structure.

The guide rails may be formed of guide rail elements of a certain length. The guide rail elements may be connected in the installation phase end-on-end one after the other in the elevator shaft. There may be adjustable fastening means between the guide rails and the brackets in order to facilitate adjustment of the guide rails. When aligning elevator guide rails the adjustable fastening means in connection with each bracket needs to be adjusted based on the straightness measurement of the guide rail.

One or several plumb lines may be arranged in the vicinity of the guide rails. The plumb lines run vertically in the shaft and are fixed at the top and at the bottom of the shaft. The plumb lines form a reference line for the straightness of the guide rails.

BRIEF DESCRIPTION OF THE INVENTION

An object of the present invention is to present a novel arrangement and method for aligning guide rails of an elevator.

The arrangement for aligning guide rails of an elevator according to the invention is defined in claim 1.

The method for aligning guide rails of an elevator according to the invention is defined in claim 11.

The arrangement for aligning guide rails of an elevator, comprises a carrier moving upwards and downwards in an elevator shaft along guide rails, at least one plumb line being provided in the vicinity of each guide rail. A laser scanner is attached fixedly or movably to the carrier or to the guide rail or to an apparatus, which is supported on walls of the elevator shaft and/or on the carrier. The horizontal position of the guide rail in relation to the plumb line is determined with the laser scanner.

The method for aligning guide rails of an elevator having a carrier moving upwards and downwards in an elevator shaft along guide rails, at least one plumb line being provided in the vicinity of each guide rail, is characterised by:

scanning the guide rail or the plumb line or both with a laser scanner attached fixedly or movably to the carrier or to the guide rail or to an apparatus, which is supported on walls of the elevator shaft and/or on the carrier, determining the horizontal position of the guide rail in relation to the plumb line based on the measurements of the laser scanner.

A mechanic may move upwards and downwards in the elevator shaft on a carrier supported on guide rails during the alignment of the guide rails. The carrier may be moved by lifting means connected to the carrier. The laser scanner may be supported fixedly or movably on the carrier when the mechanic moves between the support bracket locations in the elevator shaft. The mechanic stops the lifting means at each support bracket location and uses the laser scanner to align the guide rail at said bracket location.

The carrier may be formed by a separate installation platform used during installation of the elevator or by an elevator car. The laser scanner may be supported fixedly or movably on the carrier or on the guide rail. The laser scanner may on the other hand be attached to an apparatus, whereby the apparatus is attached to walls of the shaft and/or to the carrier. The apparatus may be a robotic adjustment tool that may be supported on the walls of the shaft and/or on the carrier. The robotic adjustment tool may extend across the shaft and it may have attachment means at both ends of the tool, whereby the attachment means may move outwards in order to lock the robotic adjustment tool between opposite walls in the shaft. It is also possible to attach the laser scanner to a frame moving on horizontal guide rails attached to the carrier. The laser scanner could then be moved into different positions on the carrier. The laser scanner could be moved to the vicinity of each of the opposite guide rails with the moving frame.

The guide rails may be aligned in relation to the direction between the guide rails (DBG) and in relation to the direction between the back wall and the front wall of the shaft (BTF).

The arrangement will speed up the process-step of aligning the elevator guide rails compared to manual prior art methods. The arrangement will also minimize variations in the quality of the alignment. The quality of the alignment will be less dependent on the person performing the alignment. A trained technician can easily make a high quality alignment with the help of the arrangement.

The arrangement can be used in aligning the guide rails in a new installation and in re-adjusting the alignment of the guide rails in an existing elevator. The arrangement can be used in manual installation and adjustment of the guide rails as well as in robotic installation and adjustment of the guide rails. The apparatus can also be used in rail straightness and ride comfort measurements.

A 2D laser scanner is advantageously used in the invention. A 2D laser scanner may be optimized to small distances i.e. distances in the order of 100 mm. A 2D laser scanner may provide a resolution of less than 50 micro meter, advantageously less than 10 micro meter in the z-direction i.e. in the direction from the light source of the laser scanner to the object to be measured. The diameter of the plumb line may be in the order of 1 mm, which means that a high accuracy is needed of the 2D laser scanner in order to be able to measure the exact position of the guide surfaces of the guide rail in relation to the plumb line.

BRIEF DESCRIPTION OF THE DRAWINGS

The invention will in the following be described in greater detail by means of preferred embodiments with reference to the attached drawings, in which.

DETAILED DESCRIPTION OF EMBODIMENTS OF THE INVENTION

Figure 1:
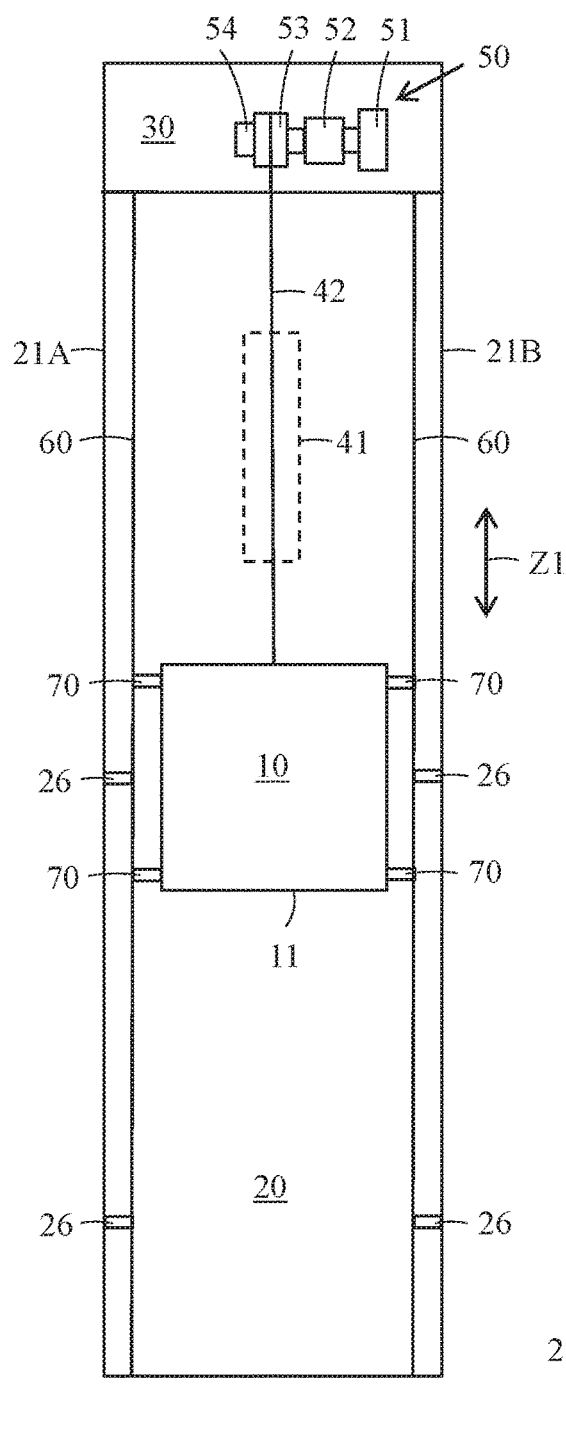
FIG. 1 shows a vertical cross section of an elevator.

FIG. 1 shows a vertical cross section of an elevator.

The elevator comprises a car 10, an elevator shaft 20, a machine room 30, lifting machinery 50, ropes 42, and a counter weight 41. A separate or an integrated car frame 11 may surround the car 10.

The lifting machinery 50 positioned in the machine room 30 may comprise a drive 51, an electric motor 52, a drive pulley 53, and a machinery brake 54. The lifting machinery 50 moves the car 10 in a vertical first direction Z1 upwards and downwards in the vertically extending elevator shaft 20. The machinery brake 54 stops the rotation of the drive pulley 53 and thereby the movement of the elevator car 10.

The car frame 11 may be connected by the ropes 42 via the drive pulley 53 to the counter weight 41. The car frame 11 may further be supported with glide means 70 on car guide rails 60 extending in the vertical direction in the shaft 20. The glide means 70 may comprise rolls rolling on the car guide rails 60 or gliding shoes gliding on the car guide rails 60 when the car 10 is moving upwards and downwards in the elevator shaft 20. The car guide rails 60 may be attached with fastening brackets 26 to the side wall structures 21 in the elevator shaft 20. The glide means 70 keep the car frame 11 and thereby also the car 10 in position in the horizontal plane when the car 10 moves upwards and downwards in the elevator shaft 20. The counter weight 41 may be supported in a corresponding way on counter weight guide rails that are attached to the wall structure 21A, 21B of the shaft 20.

The car 10 transports people and/or goods between the landings in the building. The elevator shaft 20 can be formed so that the wall structure 21A, 21B is formed of solid walls or so that the wall structure 21A, 21B is formed of an open steel structure.

The guide rails 60 extend vertically along the height of the elevator shaft 20. The guide rails 60 are thus formed of guide rail elements of a certain length e.g. 5 m. The guide rail elements are connected in the installation phase end-on-end one after the other.

Variations in the alignment of the guide rails 60 will result in lateral forces acting on the glide means 70 when the car 10 moves upwards and downwards in the elevator shaft 20. These lateral forces might cause vibrations to the glide means 70 and thereby also to the elevator car 10. The vibrations acting on the elevator car 10 will also cause noise disturbing the passengers in the elevator car 10.

Figure 2:
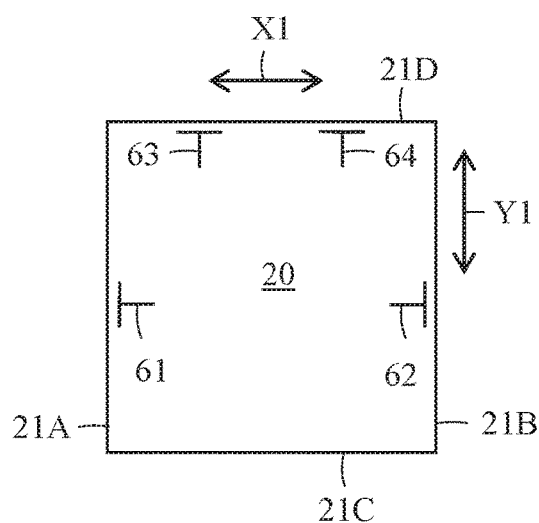
FIG. 2 shows a horizontal cross section of the elevator.

FIG. 2 shows a horizontal cross section of the elevator shaft.

The walls 21A, 21B, 21C, 21D of the shaft 20 may form a rectangle. There may be first guide rails 61, 62 attached to opposite side walls 21A, 21B of the shaft 20 guiding the elevator car 10. There may further be second guide rails 63, 64 attached to a back wall 21D of the shaft 20 guiding the counterweight 42. The front wall 21C of the shaft 20 may be provided with landing doors on each landing. The figure shows also a horizontal second direction X1 i.e. the direction between the car guide rails (DBG) in the shaft 20 and a horizontal third direction Y1 i.e. the direction from the back to the front (BTF) of the shaft 20. The second direction X1 is perpendicular to the third direction Y1.

Figure 3:
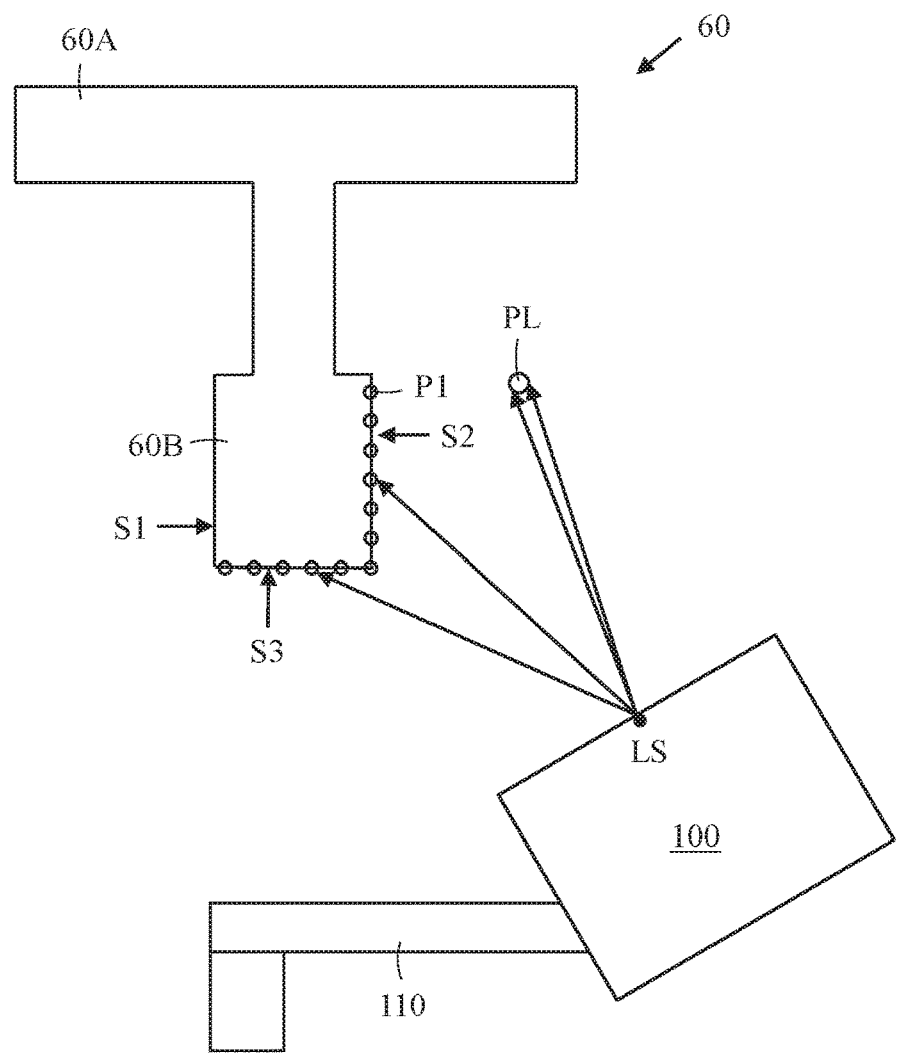
FIG. 3 shows a horizontal view of a first embodiment of an arrangement according to the invention.
Figure 3:
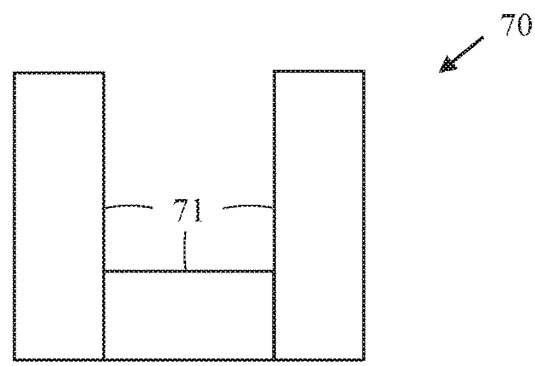

FIG. 3 shows a horizontal view of a first embodiment of an arrangement according to the invention.

A horizontal cross section of the guide rail 60 has the shape of a letter T. The T shaped guide rail 60 comprises a support branch 60A and a middle branch 60B or guide branch 60B comprising three guide surfaces S1, S2, S3. The middle branch 60B comprises two opposite side guide surfaces S1, S2 and a front guide surface S3 being perpendicular to the side glide surfaces S1, S2. The front guide surface S3 extends between the side guide surfaces S1, S2. The support branch 60A of the guide rail 60 may be attached with adjustable fastening means to the support brackets 26, the support brackets 26 being attached to the side walls 21A, 21B or to the back wall 21D of the elevator shaft 20.

A horizontal cross-section of the glide means 70 may have the form of a letter U so that the inner surface 71 of the glide means 70 sets against the three guide surfaces S1, S2, S3 of the guide rail 60. The glide means 70 may be attached to the car frame 11. The glide means 70 may on the other hand comprise rolls, whereby the rolls roll on the three guide surfaces S1, S2, S3.

A 2D laser scanner 100 may be attached with a support arm 110 to the elevator car 10. The laser scanner 100 could be attached to any carrier 10 being arranged to move upwards and downwards in the shaft 20. The carrier 10 could e.g. be an installation platform being used by technicians for moving upwards and downwards in the shaft 20 during the installation of the elevator. The laser scanner 100 may instead of being attached directly to the carrier 10 be attached to any equipment attached to the carrier 10. The laser scanner 10 would thus be indirectly attached to the carrier 10. The laser scanner 100 may be angled in relation to the guide rail 60 so that two guide surfaces S2, S3 and the plumb line PL are inside the measurement range of the laser scanner 100.

2D points P1 on both guide surfaces S2 and S3 as well as on the plumb line PL may then be measured with the laser scanner 100. The position of the points P1 are measured in relation to the position of the laser scanner 100.

A 2D laser scanner 100 may perform contactless measurements of an object. The 2D laser scanner 100 may be provided with a light sources LS producing light pulses at a high frequency. The light pulses may be directed to a lens, whereby a line of light pulses are directed towards the object. Radiation scattered by the object may be collected by the lens and directed to a two-dimensional CMOS image sensor. The image of the object may be analysed by a signal processor, which calculates the distance to the object for each point of the set of points along the laser line on the object. The position of the measurement points on the line on the object in relation to the 2D laser scanner 100 may thus be determined.

The working principle of short range 2D laser scanners is usually based on triangulation. In triangulation a laser emitter, a laser dot, and a CMOS image sensor form a triangle. The CMOS image sensor is angled in relation to the light source of the laser scanner. The CMOS image sensor detects laser dots in the surface of the object to be measured. This method works well only on relatively small distances and the scanning angle is limited. Different models of 2D laser scanners may be optimized for a certain measurement range.

The measurement range of a 2D laser scanner is typically in the order of 100 mm. The measurement range means the distance between the object to be measured and the laser scanner 100. The 2D laser scanner is in this first embodiment located away from the guide rail 60, which eliminates the possibility for collision with the brackets, clips, fixing bolts etc. associated with the guide rail 60. If a sensor with a wide measurement area is used, both plumb line and the surfaces S1, S2, S3 of the guide rail 60 can be measured at the same time. There is thus no need for a mechanical connection between the support of the laser scanner and the guide rail 60. This increases the flexibility of the measurement method.

Figure 4:
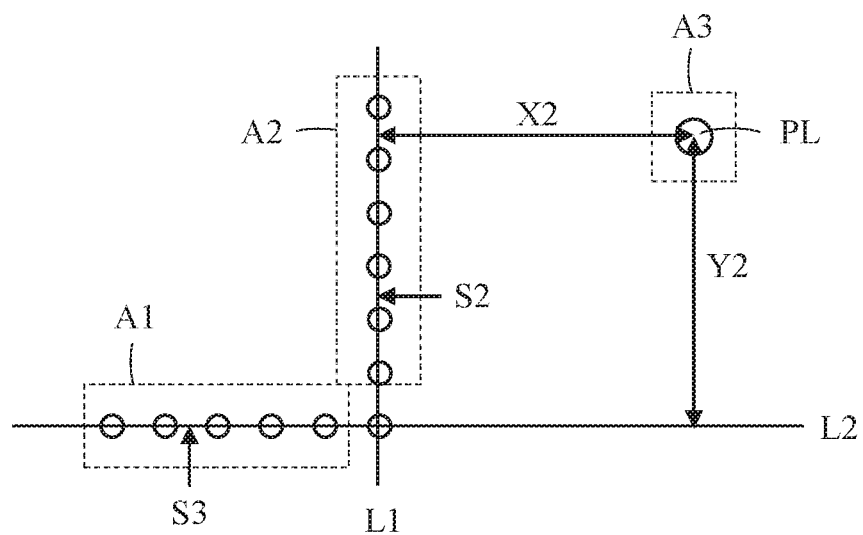
FIG. 4 shows the principle of the invention.

FIG. 4 shows the principle of the invention.

The dimensions and the geometry of the guide rail 60 are prior known, which means that the measured points P1 relating to the glide surfaces S2 and S3 can be filtered A1 and A2 based on these prior known dimensions and geometry of the guide rail 60. A coarse location of the plumb line PL is also prior known, which means that the measured points P1 relating to the plumb line PL can also be filtered A3 based on the prior known coarse location of the plumb line PL. The filtering may be done by fitting a rectangular area A1, A2, A3 on the expected location of the glide surfaces S2, S3 and the plumb line PL as shown in the figures. The measured points P1 within the respective areas A1, A2 of the guide surfaces S2, S3 of the guide rail 60 are then used to fit a line L1, L2 to said points P1. A circle is fitted to the measured points P1 of the plumb line PL. The location X2, Y2 of the plumb line PL in relation to the glide surfaces S2, S3 of the guide rail 60 can then be calculated.

The position of the guide rail 60 may then be adjusted with the adjustable fastening means between the guide rail 60 and the fastening bracket 26 so that the distance X2, Y2 from the plumb line PL to the respective glide surface S2, S3 of the guide rail 60 reaches the desired value.

Figure 5:
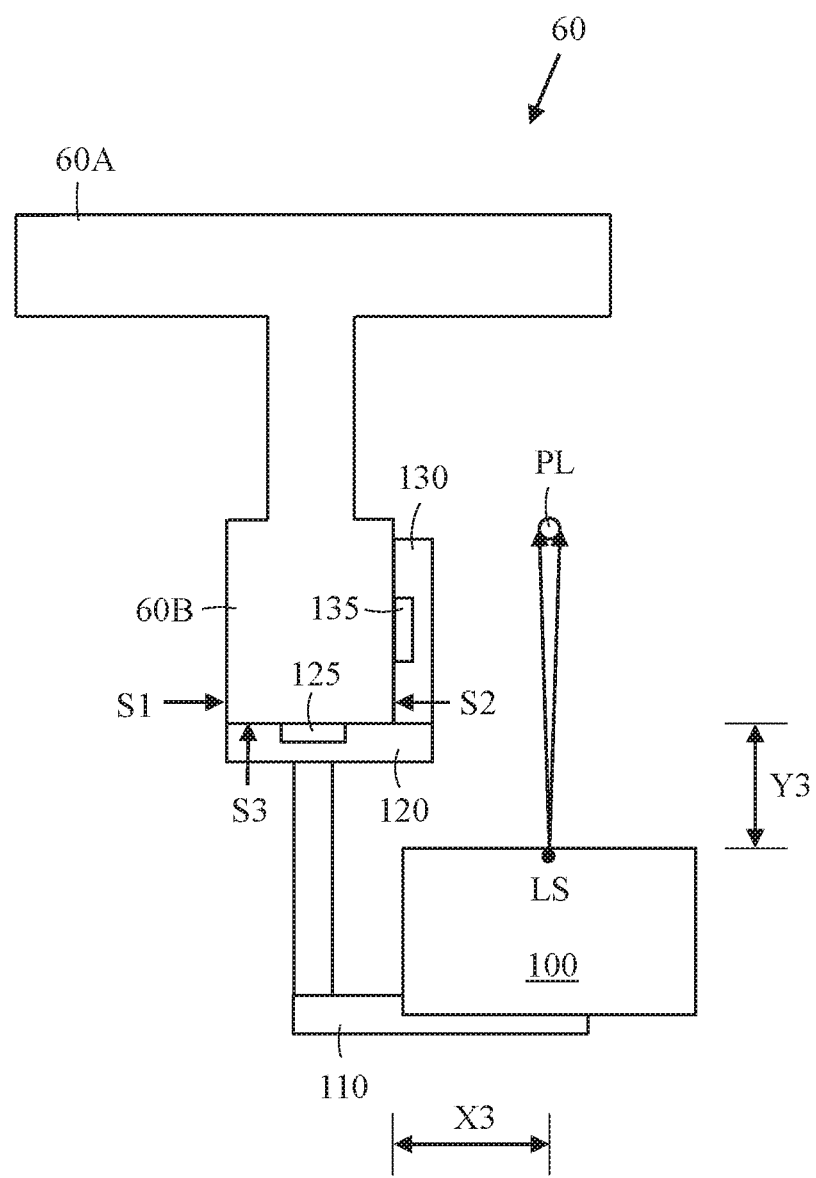
FIG. 5 shows a second embodiment of an arrangement according to the invention.

FIG. 5 shows a second embodiment of an arrangement according to the invention.

The difference in this second embodiment in relation to the first embodiment is in the attachment of the laser scanner 100. The support arm 110 of the laser scanner 100 is in this second embodiment attached to the guide rail 60. The support arm 110 may comprise two perpendicular portions 120, 130 being dimensioned to fit to a respective guide surface S2, S3 of the guide rail 60. The perpendicular portions 120, 130 of the support arm 110 may comprise magnets 125, 135 by means of which the support arm 110 may be attached to respective guide surfaces S2, S3 of the guide rail 60.

The relative position of the 2D laser scanner and the guide rail 60 is fixed in this embodiment. The perpendicular distance Y3 from the front guide surface S3 of the guide rail 60 to the light source LS of the laser scanner 100 as well as the perpendicular distance X3 from the second side guide surface S2 to the light source LS of the laser scanner 100 is thus known.

There is thus only a need to measure the position of the plumb line PL in relation to the light source LS of the laser scanner 100 in this second embodiment. The laser scanner 100 may scan the plumb line PL and thereby determine the horizontal position of the plumb line PL in relation to the light source LS of the laser scanner 100.

The position of the guide surfaces S2 and S3 in relation to the plumb line PL can be determined when the position of the plumb line PL in relation to the light source LS of the laser scanner 100 has been determined.

The position of the guide rail 60 may then be adjusted with the adjustable attaching means between the guide rail 60 and the fastening bracket 26 so that the distance from the plumb line PL to the respective glide surface S2, S3 of the guide rail 60 reaches the desired value.

The arrangement according to the second embodiment will simplify data processing in relation to the arrangement according to the first embodiment.

There is at least one plumb line PL in the vicinity of each guide rail 60 in the shaft 20. There could be only one plumb line PL in connection with each guide rail 60. There could on the other hand be two plumb lines PL in connection with each guide rail 60. The diameter of the plumb line PL is in the order of 1 mm.

The distance from the light source LS of the laser scanner 100 to the object to be measured is less than 150 mm, preferably less than 100 mm. The object to be measured is the guide surfaces S1, S2, S3 of the guide rail 60 and the plumb line PL. The resolution of the laser scanner is less than 50 micro meter, advantageously less than 10 micro meter.

The figures show an elevator car 10 used as a carrier moving upwards and downwards in the shaft 20. The carrier 10 could instead be an installation platform moving upwards and downwards in the shaft. An installation platform may be used e.g. during the installation of the elevator in the shaft 20.

The invention may be used in a manual installation and alignment of the guide rails 60 in the shaft 20. The invention may on the other hand be used also in an automated installation of the guide rails 60. There could be different equipment positioned fixedly or movably on the installation platform for performing an automated installation of the guide rails 60. The equipment could be controlled by a central computer.

The invention can be used in any type of elevator i.e. the use of the invention is not limited to the elevator disclosed in the figures. The elevator may or may not be provided with a machine room. The counterweight could be positioned on either side wall or on both side walls or on the back wall of the elevator shaft. The drive, the motor, the drive pulley, and the machine brake could be positioned in the machine room or somewhere in the elevator shaft. The car guide rails could be positioned on opposite side walls of the shaft or on a back wall of the shaft in a so called ruck-sack elevator.

It will be obvious to a person skilled in the art that, as the technology advances, the inventive concept can be implemented in various ways. The invention and its embodiments are not limited to the examples described above but may vary within the scope of the claims.

The invention claimed is:

1. A system, comprising:
   a carrier configured to move upwards and downwards in an elevator shaft along a guide rail; and
   a plumb line in a vicinity of the guide rail; and
   a laser scanner attached to
   the carrier, or
   an apparatus that is supported on one or more walls of the elevator shaft and/or on the carrier, wherein the laser scanner is a 2D laser scanner that is configured to perform a contactless measurement of both the guide rail and the plumb line to enable a contactless determination of a horizontal position of the guide rail in relation to the plumb line based on emitting light pulses towards both the guide rail and the plumb line and detecting reflection of one or more light pulses from the plumb line and one or more guide surfaces of the guide rail.

2. The system according to claim 1, wherein a resolution of the laser scanner is less than 50 micro meters.

3. The system according to claim 1, wherein the carrier is an elevator car.

4. The system according to claim 1, wherein the carrier is an installation platform.

5. The system according to claim 1, wherein
the laser scanner is attached to the apparatus, and
the apparatus is an alignment tool extending across the elevator shaft.

6. The system according to claim 1, wherein
the guide rail includes two parallel side guide surfaces and a front guide surface, the front guide surface being perpendicular to the side guide surfaces, and
the contactless determination of the horizontal position of the guide rail in relation to the plumb line includes
determining a horizontal position of one side guide surface of the guide rail in relation to the plumb line based on detecting reflection of one or more light pulses from the one side guide surface, and
determining a horizontal position of the front guide surface in relation to the plumb line based on detecting reflection of one or more light pulses from the front guide surface.

7. The system according to claim 6, wherein
the laser scanner is attached to the carrier.

8. The system according to claim 1, wherein
a horizontal cross section of the guide rail has a shape of a letter T,
side surfaces of a middle branch of the T define two opposite side guide surfaces of the guide rail, and
a front surface of the middle branch of the T defines a front guide surface of the guide rail, where the front surface is perpendicular to the two opposite side guide surfaces of the guide rail.

9. A method for aligning a guide rails of an elevator, the elevator including a carrier configured to move upwards and downwards in an elevator shaft along the guide rail, and at least one plumb line in a vicinity of the guide rail the method comprising:
performing a contactless measurement of both the guide rail and the plumb line with a laser scanner that is attached fixedly or movably to the carrier, or to an apparatus that is supported on one or more walls of the elevator shaft and/or on the carrier based on emitting one or more light pulses from the laser scanner towards both the guide rail and the plumb line and detecting reflection of one or more light pulses from the plumb line and one or more guide surfaces of the guide rail,
performing a contactless determination of a horizontal position of the guide rail in relation to the plumb line based on the contactless measurement of both the guide rail and the plumb line.

10. The method according to claim 9, wherein
the contactless determination includes
determining a horizontal position of one side guide surface of the guide rail in relation to the plumb line based on detecting reflection of one or more light pulses from the one side guide surface, and
determining a horizontal position of a front guide surface of the guide rail in relation to the plumb line based on detecting reflection of one or more light pulses from the front guide surface.

11. The method according to claim 10, wherein the contactless determination of the horizontal positions of both the one side guide surface and the front guide surface of the guide rail in relation to the plumb line includes
fitting a first line to measured points of reflection of emitted light pulses from the side guide surface of the guide rail,
fitting a second line to measured points of reflection of emitted light pulses from the front guide surface of the guide rail,
fitting a circle to measured points of reflection of emitted light pulses from the plumb line, and
determining the horizontal positions of the scanned side guide surface and the front guide surface in relation to the plumb line based on the first line and the second line.

* * * * *